United States Patent
Xiao et al.

(10) Patent No.: US 9,529,438 B2
(45) Date of Patent: Dec. 27, 2016

(54) PRINTING STRUCTURED DOCUMENTS

(75) Inventors: Jun Xiao, Palo Alto, CA (US); Clayton Atkins, Mountain View, CA (US); Tong Zhang, San Jose, CA (US); Sam Liu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1805 days.

(21) Appl. No.: 12/865,853

(22) PCT Filed: Jan. 31, 2008

(86) PCT No.: PCT/US2008/001438
§ 371 (c)(1),
(2), (4) Date: Dec. 2, 2010

(87) PCT Pub. No.: WO2009/154589
PCT Pub. Date: Dec. 23, 2009

(65) Prior Publication Data
US 2011/0194139 A1 Aug. 11, 2011

(51) Int. Cl.
*G06F 3/12* (2006.01)
*G06F 3/01* (2006.01)

(52) U.S. Cl.
CPC ............ *G06F 3/017* (2013.01); *G06F 3/1205* (2013.01); *G06F 3/125* (2013.01); *G06F 3/1219* (2013.01); *G06F 3/1284* (2013.01); *G06F 3/1253* (2013.01)

(58) Field of Classification Search
USPC ....................................................... 358/1.15
See application file for complete search history.

(56) References Cited

U.S. PATENT DOCUMENTS 6,636,648 B2 10/2003 Loui et al.
6,636,650 B1 10/2003 Long et al.
(Continued)

FOREIGN PATENT DOCUMENTS

CN 1489034 A 4/2004
JP 2002192800 7/2002
(Continued)

OTHER PUBLICATIONS

Gestural Communication over Video Stream (Nov. 2003) http://bluecoat-02/?cfru=aHR0cDovL3d3dy5jcy5jbXUuZWR1L35nZX-N0dXJlcy9wYXBIcnMvcDEwNy1vdS5wZGY=.*
(Continued)

*Primary Examiner* — Huo Long Chen
(74) *Attorney, Agent, or Firm* — Law Office of Edouard Garcia (57) ABSTRACT

Print objects (38) are captured. In the process of capturing each of the print objects (38) a user input gesture (34) over a region of a document (18) being rendered on a display (16) in accordance with a structured object specification (20) of the document (18) is received; an element of the structured object specification (20) being rendered within an active area of the user input gesture (34) on the display (16) is identified; the user input gesture (34) is interpreted as a print content designation command; and the print object (38) is derived from the structured object specification (20) in accordance with the identified element of the structured object specification (20) and the print content designation command. A print layout (32) of the print objects (38) on one or more pages (50) is determined. The print layout (32) is outputted.

20 Claims, 6 Drawing Sheets

(56) References Cited

U.S. PATENT DOCUMENTS

| | | |
|---|---|---|
| 6,981,213 B2 | 12/2005 | Barmettler |
| 7,088,465 B2 | 8/2006 | Bates et al. |
| 7,249,319 B1 | 7/2007 | Payne |
| 7,307,745 B2 | 12/2007 | Tanaka |
| 2002/0073093 A1 | 6/2002 | Aoyama et al. |
| 2002/0081040 A1 | 6/2002 | Uchida |
| 2002/0135800 A1 | 9/2002 | Dutta |
| 2002/0143818 A1 | 10/2002 | Roberts et al. |
| 2002/0188635 A1 | 12/2002 | Larson |
| 2003/0156145 A1 | 8/2003 | Hullender et al. |
| 2004/0066531 A1* | 4/2004 | Kim ............ 358/1.15 |
| 2004/0105127 A1* | 6/2004 | Cudd et al. ............ 358/1.18 |
| 2004/0257346 A1 | 12/2004 | Ong et al. |
| 2005/0021673 A1 | 1/2005 | Frohlich et al. |
| 2005/0024682 A1* | 2/2005 | Hull et al. ............ 358/1.18 |
| 2006/0041589 A1 | 2/2006 | Helfman et al. |
| 2006/0041839 A1 | 2/2006 | Kassan |
| 2006/0075363 A1 | 4/2006 | Mizoguchi |
| 2006/0285163 A1* | 12/2006 | Han et al. ............ 358/1.18 |
| 2007/0064288 A1* | 3/2007 | Lee ............ 358/527 |
| 2007/0106952 A1 | 5/2007 | Matas et al. |
| 2007/0150838 A1 | 6/2007 | Moser |
| 2007/0234207 A1 | 10/2007 | Turakhia |
| 2007/0294630 A1 | 12/2007 | Duncan et al. |
| 2008/0137142 A1* | 6/2008 | Jung ............ 358/1.18 |

FOREIGN PATENT DOCUMENTS

| | | |
|---|---|---|
| JP | 2006099389 A | 4/2006 |
| WO | WO-03/038668 A2 | 5/2003 |

OTHER PUBLICATIONS

Gestural Communication over Video Stream (Nov. 2003) http://bluecoat-07/?cfru=aHR0cDovL3NmdXNzZWxsLmhjaS5jb-3JuZWxsLmVkdS9wdWJzL01hbnVzY3JpcHRzL3AxMDctb-UucGRm.*

* cited by examiner

PRINTING STRUCTURED DOCUMENTS

CROSS-REFERENCE TO RELATED APPLICATIONS

This application relates to the following copending application, which is incorporated herein by reference: U.S. application Ser. No. 11/769,671, filed Jun. 27, 2007.

BACKGROUND

A document is a set of information that is designed and presented as an individual entity and is recorded or stored in a physical storage medium (e.g., an electronic memory device or a print medium, such as paper). A structured document is formed of displayable elements (e.g., text, images, audio, and video) whose presentations are related to one another. The elements typically are related to one another in terms of their layout and relative location within the document. Document elements may be formed from lower-level elements. For example, texts typically are formed from words, sentences, and paragraphs. Images typically are formed from different layers (e.g., foreground and background) and different areas. Audio and video typically are formed from temporally and hierarchically arranged units and sequences of audio and video content, respectively.

The logical structure or semantics of a structured document can be described using a markup language, such as the standard generated markup language (SGML), the extensible markup language (XML), and a hypertext markup language (HTML). A markup language description of a document typically includes a set of tags that delimit and label discrete elements of the document. In XML, for example, a tag is a keyword that identifies the beginning and ending points of its associated element. Markup language tags typically have a distinct syntax that distinguishes them from the elements that they surround. The tag syntax allows a parser to recognize the tag. A structured document can be presented by any tool (e.g., a web browser) that is capable of interpreting the markup language description of the document. In some cases, one or more style sheets (e.g., cascading style sheets (CSS)) can be attached to the logical structure of the document to produce different respective presentations.

In many cases, a structured document presentation that is designed for one application environment is not suitable or at least not optimized for another application environment. For example, web pages typically are ill-formatted for printing. As a result, users typically consume more resources (e.g., ink and paper) than needed when they print entire web pages that contain contents, such as advertisements, headers, footers, center column, and large margin design features, which are not of interest to the users.

SUMMARY

In one aspect, the invention features a method in accordance with which print objects are captured. In the process of capturing each of the print objects a user input gesture over a region of a document being rendered on a display in accordance with a structured object specification of the document is received; an element of the structured object specification being rendered within an active area of the user input gesture on the display is identified; the user input gesture is interpreted as a print content designation command; and the print object is derived from the structured object specification in accordance with the identified element of the structured object specification and the print content designation command. A print layout of the print objects on one or more pages is determined. The print layout is outputted.

The invention also features apparatus and a machine readable medium storing machine-readable instructions causing a machine to implement the method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of enabling a user to specify individual elements of structured documents that they would like to print. In this way, these embodiments reduce unnecessary consumption of resources, such as paper and ink. In addition, some of these embodiments are capable of aggregating contents from resources outside of a structured document based on user selection of hyperlink references in structured document. In some implementations, this feature provides users with a convenient mechanism for aggregating content across different web pages and different web sites.

II. Definition of Terms

As used herein, the term "document" means a set of information that is designed and presented as an individual entity and is recorded or stored in a physical storage medium (e.g., an electronic memory device or a print medium, such as paper). A "structured document" is a document that is formed of displayable "elements" (i.e., a cohesive subset of the constituent information of a structured document, e.g., text, images, audio, and video) whose presentations are related to one another spatially, temporally, or spatiotemporally. Spatially related elements typically are related to one another in terms of layout and relative location within the document. Document elements may be formed from lower-level elements.

The term "structured object specification" means a description of the logical structure or semantics of a structured document. This information may be described using a markup language, such as the standard generated markup language (SGML), the extensible markup language (XML), and a hypertext markup language (HTML). In XML, for example, a structured document is described as a document object that contains a set of nested XML elements. A structured object specification may be presented through an application programming interface (API). For example, the Document Object Model (DOM) is a specification for an API that allows programs and scripts to access and modify the content, structure, and style of structured documents. The DOM represents structured documents in the form of a hierarchical tree of nodes, which implement specialized interfaces. Each node has a DOM node type, a node name, and a node value. The DOM structures the document object and its constituent elements into multiple nodes of different types, providing views of the document structure at different levels of detail.

The term "print object" refers broadly to any type of visually perceptible structured document content that may be rendered on a physical or virtual page, including images and text. Image-based print objects may be complete or partial versions of any type of digital or electronic image element of a structured document, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. The term "print object" encompasses both a single-element print object and a multi-element print object formed from a cohesive group or collection of one or more structured document elements. The assignment of multiple structured document elements to a single print object signifies that the constituent structured document elements are related. In general, the type of structured document elements in a multi-element print object may be the same or different.

The term "user input gesture" means a graphical input that is received from a user and may be interpreted as a command. The input may correspond to any type of graphical input (e.g., an input generated by user manipulation of a stylus or a virtual pointer, such as a computer mouse). In some embodiments, the user input gesture corresponds to a freeform graphical shape, which may be composed of a sequence of one or more strokes (i.e., a sequence or set of captured points). In other embodiments, the user input gesture corresponds to a constrained graphical shape (e.g., a rectangular or curved boundary) whose size or aspect ratio, or both, may be selected by the user.

The term "print content designation command" means a command that indicates whether an element of a structured document should be included in a print layout or excluded from a print layout.

The term "print layout" means an arrangement of a set of print objects on one or more pages.

The term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

A "node" is a junction or connection point in a network. Exemplary nodes include, but not limited to, a terminal, a computer, and a network switch.

III. Overview of an Embodiment of a Structured Document Printing System

Figure 1:
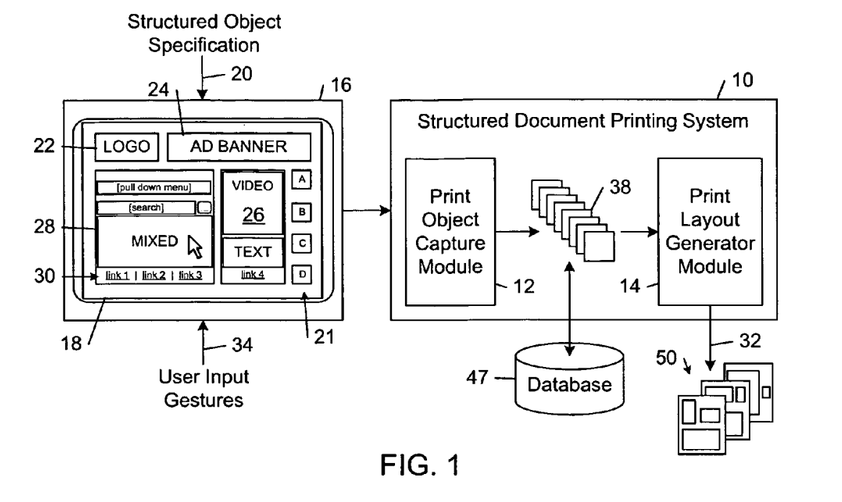
FIG. 1 is a block diagram of an embodiment of a structured document printing system.

FIG. 1 shows an embodiment of a structured document printing system 10 that includes a print object capture module 12 and a print layout generator module 14. The printing system 10 interfaces with a display 16 that renders (or presents) a structured document 18 in accordance with a structured object specification 20 of the document 18.

The structured document 18 may be any type of electronic document that is associated with a structured object specification 20 that describes the structure of the document 18 in a way that allows a parser (or interpreter) to separate the contents of the document from the structural description (or "markup"). In some embodiments, the structured object specification 20 is in the form of an electronic file that describes (or models) the document using a markup language, such as SGML, XML, and HTML. In the illustrated embodiment, the structured document 18 includes regions of various types of content (e.g., image content regions, such as a LOGO region 22, an AD BANNER region 24, and an image region 21 that includes a set of four images A, B, C, D; a video clip region 26; a mixed content region 28; and a hyperlink reference region 30 that includes a set of three hyperlink references) whose layout and relative locations within the document 18 constitute the structure of the document 18.

The structured document printing system 10 generates a print layout 32 of a set of elements of the structured document 18 that a user has designated for printing. In addition, the structured document printing system 10 is capable of aggregating contents from resources outside the structured document based on user selection of hyperlink references in structured document. The structured document printing system 10 enables the user to designate individual elements of the document 18 that he or she would like to print using input gestures 34, which in some cases may rather coarsely coincide with the actual rendering of the elements on the display 16. The structured document printing system 10 interprets gestures 34 that are input by the user based on an analysis of the structural description of the document 18 that is provided by the structured object specification 20. In these ways, the structured document printing system 10 reduces unnecessary consumption of resources, such as paper and ink, while providing a quick, efficient, and convenient mechanism for the use to specify print content designation commands.

The structured document printing system 10 may be implemented in any computing or processing environment, including in digital electronic circuitry or in computer hardware, firmware, or software. In some embodiments, the print object capture module 12 and the print layout generator module 14 are implemented by one or more respective software modules that are executed on a computer. Computer process instructions for implementing the structured document printing system 10 and the data it generates typically are stored in one or more machine-readable media.

Figure 2:
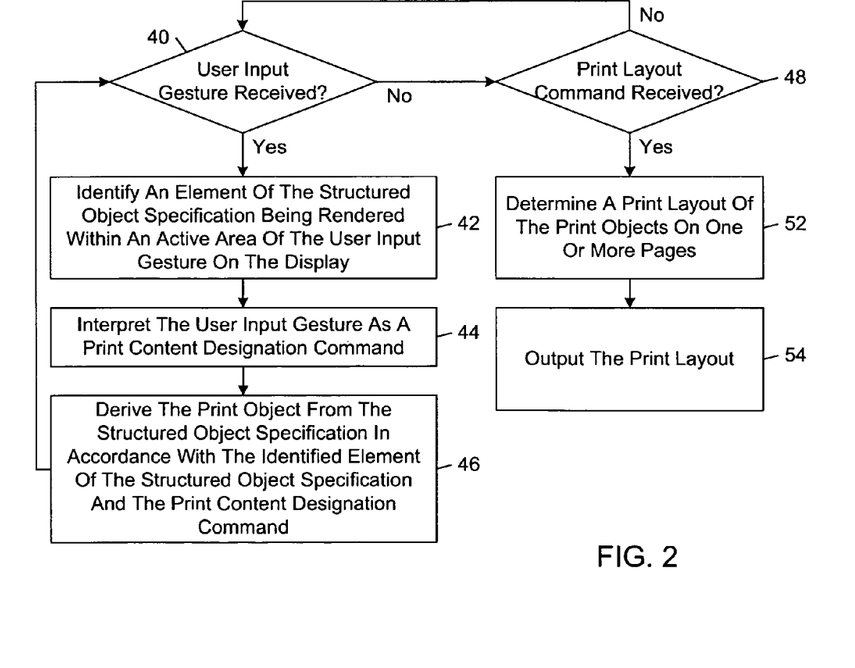
FIG. 2 is a flow diagram of an embodiment of a structured document printing method.

FIG. 2 shows an embodiment of a method by which the structured document printing system 10 generates a print layout 32 of the user-designated elements of the structured document 18.

In response to receipt of each user input gesture 34 over a region of the document 18 being rendered on the display 16, the print object capture module 12 initiates a process of capturing a print object 38 (FIG. 2, block 40). In this process, the print object capture module 12 identifies an element of the structured object specification 20 that is being rendered within an active area of the user input gesture 34 on the display 16 (FIG. 2, block 42). The print object capture module 12 interprets the user input gesture 34 as a print content designation command (FIG. 2, block 44). The print object capture module 12 derives the print object 38 from the structured object specification 20 in accordance with the identified element of the structured object specification 20 and the print content designation command (FIG. 2, block 46). The print object capture module 12 typically stores the print objects 38 in a database 47 on a machine-readable medium (see FIG. 1).

In response to receipt of a print layout generation command from the user (FIG. 2, block 48), the print layout generator module 14 determines the print layout 32 of the print objects 38 on one or more pages 50 (FIG. 2, block 52) and outputs the print layout 32 (FIG. 2, block 54). The print layout 32 can be output by the print layout generator module 14 in a variety of different ways. For example, the print layout 32 can be output by rendering it in a preview window on the display 16, storing it in a database on a machine-readable medium, and rendering it on a print medium (e.g., paper).

IV. Exemplary Embodiments of the Structured Document Printing System and its Components A. Overview The structured document printing system 10 typically is implemented by one or more discrete data processing modules (or components) that are not limited to any particular hardware, firmware, or software configuration. For example, in some implementations, the structured document printing system 10 is embedded in the hardware of any one of a wide variety of electronic apparatus, including desktop, laptop, and workstation computers, cable or satellite set-top boxes capable of browsing web pages and the like, and portable telecommunications devices (e.g., web browser enabled mobile telephones).

The print object capture module 12 and the print layout generator module 14 are data processing components that may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of these data processing components 12-14 are combined into a single data processing component. In some embodiments, the respective functionalities of each of one or more of these data processing components 12-14 are performed by a respective set of multiple data processing components. In some embodiments, the print object capture module 12 and the print layout generator module 14 are integral components of an internet browser software application. In other embodiments, these modules 12-14 are provided as part of a plug-in extension to an internet browser software application program, such as the Internet Explorer web browser, the Mozilla Firefox web browser, the Safari web browser, and the Opera web browser.

In some implementations, process instructions (e.g., machine-readable code, such as computer software) for implementing the methods that are executed by the structured document printing system 10, as well as the data it generates, are stored in one or more machine-readable media.

B. Exemplary Embodiments of the Print Object Capture Module

As explained above, the print object capture module 12 initiates a process of capturing a print object in response to receipt of each user input gesture 34 over a region of the document 18 being rendered on the display 16 (FIG. 2, block 40).

A gesture is a graphical input that is received from a user and is interpretable as a command. A gesture may be input by a user in a variety of different ways. In some embodiments, the user inputs gestures using a computer mouse (e.g., by clicking the left button of the computer mouse or by clicking the left or right button of the computer mouse and moving the mouse while the button is depressed) or other input device. In some embodiments, for example, the user inputs gestures using a stylus on a digitizer input tablet.

Gestures typically are characterized by one or more of the following attributes: default action; action area; display screen position; size; and shape. The default action is the action that is taken by the print object capture module 12 in response to the gesture. In some embodiments, a gesture may have more than one default action. The action area is a region of the structured document 18 underlying at least a part of the gesture. For some gestures, the action area corresponds to only a portion of the gesture. For example, the action area of a checkmark gesture is a region of the document 18 near the vertex of the checkmark, and the action area of a cross mark (i.e., a mark formed by two intersecting lines, such as an "X", a "x", and a "+") is a region of the document 18 near the intersection of its two constituent lines. For other gestures, the action area corresponds to a region of the document 18 that is at least partially surrounded by a boundary formed by the strokes constituting the gesture. The boundary may, for example, correspond to the border of a bounding box or a freeform shape.

In the process of capturing a print object (FIG. 2, block 40), the print object capture module 12 identifies an element of the structured object specification 20 that is being rendered within an active area of the user input gesture 34 on the display 16 (FIG. 2, block 42).

Figure 3:
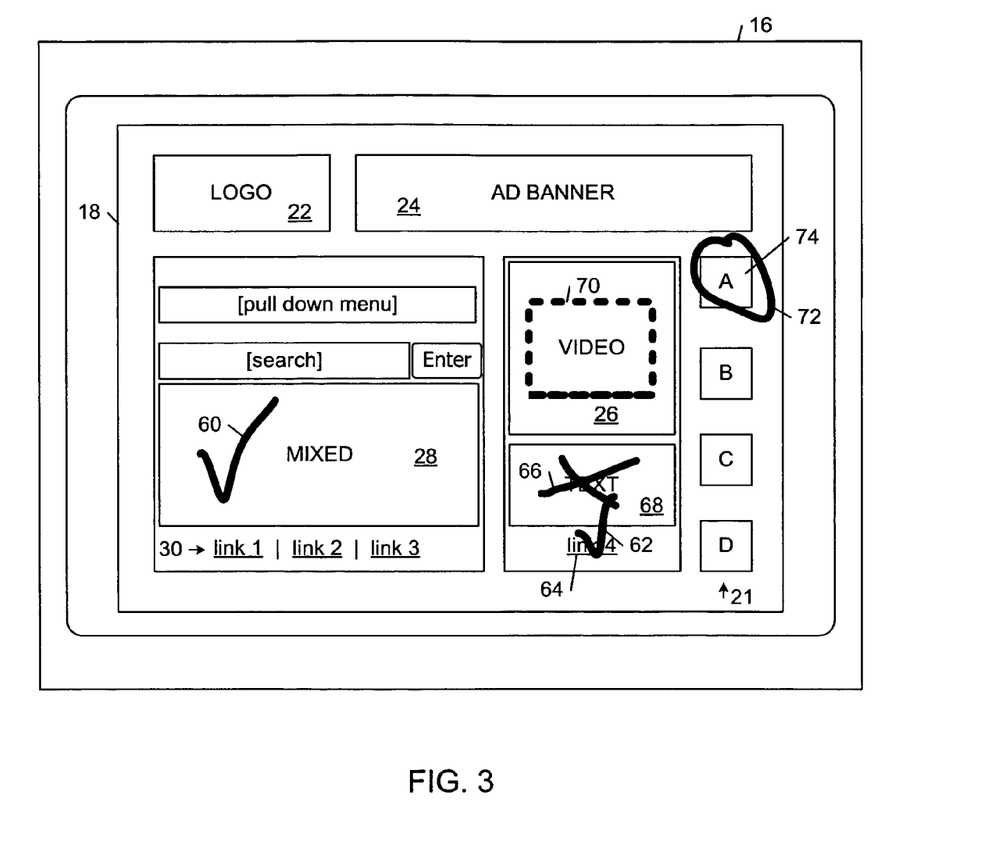
FIG. 3 is a diagrammatic view of an embodiment of a display presenting input user gestures over respective regions of a structured document.

FIG. 3 shows an embodiment of the display 16 rendering input user gestures over respective regions of the structured document 18. In particular, a checkmark gesture 60 is rendered over the mixed content region 28, a checkmark gesture 62 is rendered over a hyperlink reference region 64, a cross gesture 66 is rendered over a text region 68, a bounding box boundary gesture 70 is rendered over the video clip region 26, and a freeform boundary gesture 72 is rendered over an image region 74.

In response to receipt of the checkmark gesture 60, the print object capture module 12 identifies any element of the structured object specification 20 being rendered near the vertex of the checkmark. Depending on the content of the mixed content region 28 and the overall size of the checkmark gesture 60, the print object capture module 12 may identify all or a part of the structured object specification element being rendered in the mixed content region 28. For example, In response to receipt of the checkmark gesture 62, the print object capture module 12 identifies the structured object specification hyperlink reference element 64 ("link 4"), which is being rendered near the vertex of the checkmark gesture 62.

In response to receipt of the cross gesture 66, the print object capture module 12 identifies any element of the structured object specification 20 being rendered near the intersection of the two lines. For example, depending on the content of the text region 68 and the overall size of the cross gesture 66, the print object capture module 12 may identify all or a part of the structured object specification element being rendered in the text region 68.

In response to receipt of the bounding box boundary gesture 70, the print object capture module 12 identifies the video clip element 26, at least a part of which is being rendered within the boundary of the bounding box boundary gesture 70.

In response to receipt of the freeform boundary gesture 72, the print object capture module 12 identifies the image element 74, at least a part of which is being rendered within the boundary of the freeform boundary gesture 72.

In the process of capturing a print object (FIG. 2, block 40), the print object capture module 12 additionally interprets the user input gesture 34 as a print content designation command (FIG. 2, block 44). For example, in some embodiments, the print object capture module 12 interprets checkmark gestures and boundary gestures as print content designation commands to include the identified elements of the structured object specification in the print layout 32, whereas the print object capture module 12 interprets cross gestures as print content designation commands to exclude the identified elements of the structured object specification from the print layout 32. Thus, with respect to the embodiment illustrated in FIG. 3, these embodiments of the print object capture module 12 would interpret the user input gestures 60, 62, 70, and 72 as commands to include in the print layout 32 all or part of the structured object specification element being rendered in the mixed content region 28, the hyperlink reference element 64, the video clip element 26, and the image element 74; the print object capture module 12 additionally would interpret the user input gesture 66 as a command to exclude from the print layout 32 all or a part of the structured object specification element being rendered in the text region 68.

In the process of capturing a print object (FIG. 2, block 40), the print object capture module 12 additionally derives the print object from the structured object specification 20 in accordance with the identified element of the structured object specification 20 and the print content designation command (FIG. 2, block 46). In this process, the print object capture module 12 derives a respective print object from each of the elements of the structured object specification that is to be included in the print layout 32. Thus, with respect to the embodiment illustrated in FIG. 3, the print object capture module 12 would derive a respective print object from each of the following elements: all or part of the structured object specification element being rendered in the mixed content region 28; the hyperlink reference element 64; the video clip element 26; the image element 74; and any sub-element part of the structured object specification element being rendered in the text region 68 that has not been excluded from the print layout 32 (if any).

Figure 4:
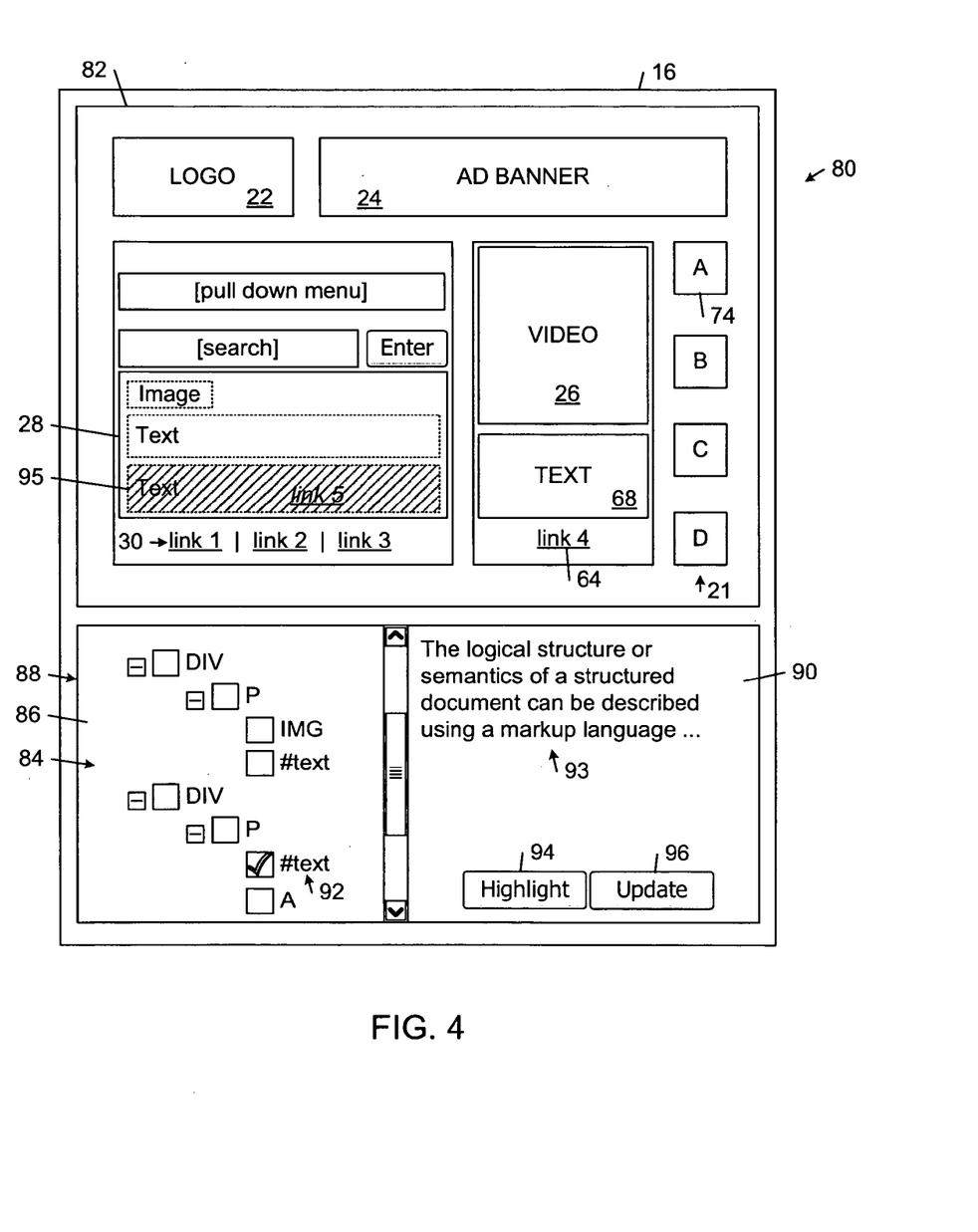
FIG. 4 is a diagrammatic view of an embodiment of a graphical user interface presenting a structured document along with a representation of a structured object specification of the document.

FIG. 4 shows an embodiment of a graphical user interface 80 presenting an embodiment 82 of the structured document 18 along with a representation 84 of a structured object specification 20 of the document 18. In the illustrated embodiment, the document 82 is a web page and the structured object specification is represented by a Document Object Model (DOM) in which each element of the structured object specification is represented by a node in a hierarchical tree. The DOM representation 84 of the structured object specification is presented in a first pane 86 of a window 88 of the graphical user interface 80. The contents corresponding to a selected element of the DOM representation 84 are presented in a second pane 90 of the window 86. For example, in the illustrated embodiment, the textual content 93 corresponding to the selected text element 92 is presented in the pane 90.

In response to a user selection of a Highlight button 94, the graphical user interface changes one or more of the display parameters (e.g., brightness, contrast, and color) of the corresponding content being presented in the window in which the structured document 82 is being presented. For example, in the illustrated embodiment, one or more of the display parameters of the second text sub-element 95 of the mixed content element being presented in the mixed content region 28 are changed so as to highlight the textual content corresponding to the selected text element 92 in the DOM representation 84.

In some embodiments, the user may modify the contents being presented in the pane 90. For example, with respect to the embodiment illustrated in FIG. 4, the user may modify the textual content 93 in any of variety of different ways, including but not limited to deleting some or all of the textual content 93, and adding new textual content. In response to a user selection of an Update button 96, the print object capture module 12 will store the modified content in a respective print object. In some embodiments, the print object capture module 12 also will present the modified content in the corresponding region 95 of the structured document 82 being rendered in the graphical user interface 80.

In some embodiments, the structured object specification 18 contains hyperlink references to respective contents of the structured document 18 instead of containing the actual content. For example, instead of containing an embedded resource (e.g., another structured document, such as a web page, or a multimedia file, such as an image file or a video clip file), the structured object specification 18 typically contains a hyperlink reference (e.g., a uniform resource locator (URL) or uniform resource identifier (URI)) that identifies an address or path name that specifies the location of the resource outside of the structured document.

In response to the receipt of an input user gesture selecting a hyperlink reference to a resource outside of the structured document 18, the print object capture module 12 retrieves the resource based on the hyperlink and generates one or more of the print objects from the resource. Depending on the type of resource retrieved, the print object capture module 12 may generate one or more print objects from the resource automatically or in response to additional user input. In some embodiments, if the retrieved resource is a structured document (e.g., a web page), the print object capture module 12 presents the structured document in a separate window on the display 16 and allows the user to input print content designation commands with respect to the presented structured document in accordance with any of the methods described herein (see, e.g., block 40-46 of the structured document printing method FIG. 2). In some embodiments, if the retrieved resource is a multimedia file (e.g., an image file or a video file), the print object capture module 12 automatically derives one or more print objects from the retrieved resource. For example, print objects may be generated from keyframes extracted from a video file or from a thumbnail image that is extracted from an image file.

Figure 5:
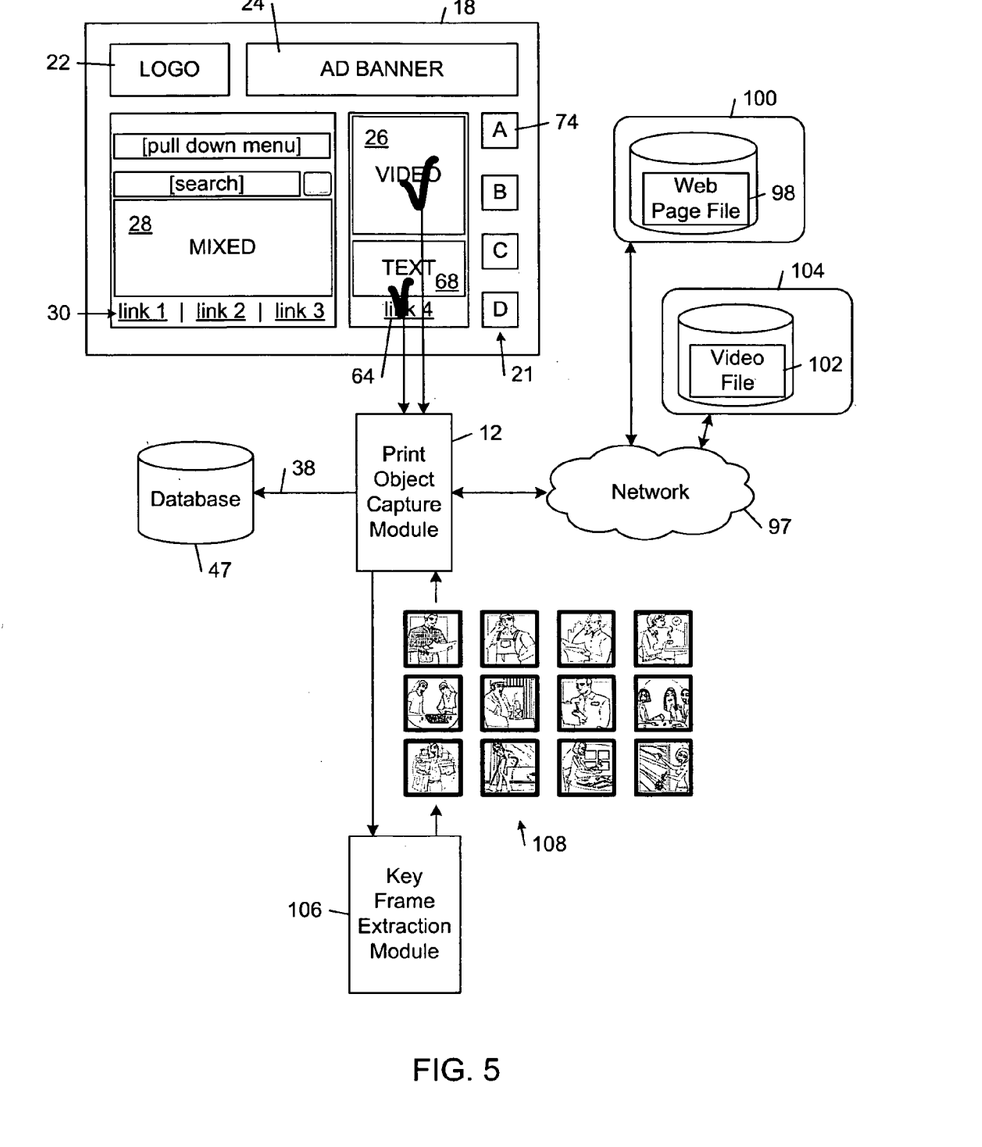
FIG. 5 is a diagrammatic view of an embodiment of a print object capturing system.

FIG. 5 shows an embodiment of a print object capturing system in which the print object capture module 12 retrieves resources from remote nodes over a network 97 (e.g., a LAN or a WAN, such as the internet) in response to input user gestures selecting hyperlink references to resources outside of the structured document 18. In the illustrated embodiment, the print object capture module 12 retrieves a web page 98 from a remote node 100 in response to a user selection of the hyperlink reference region 64 of the structured document 82 and retrieves a video file 102 from a remote node 104 in response to a user selection of the video clip region 26 of the structured document 82. After retrieving the web page file 98 from the remote node 100, the print object capture module 12 presents the web page 98 in a separate window on the display 16 and prompts the user to input print content designation commands with respect to the presented web page 98. After retrieving the video file 102 from the remote node 104, the print object capture module 12 derives one or more keyframes from the retrieved video file and generates a respective print object from the keyframes. In some cases, the keyframes are embedded in the video file 102. In these cases, the print object capture module 12 derives the keyframes by extracting one or more of the keyframes that are embedded in the video file 102. In other cases, the print object capture module 12 derives the keyframes by passing the retrieved video file 102 to a keyframe extraction module 106. The keyframe extraction module 106 extracts a set of keyframes 108 from the video file 102 using any of a variety of keyframe extraction methods. The keyframe extraction module 106 sends the extracted keyframes 108 to the print object capture module 12. The print object capture module 12 generates a respective print object from one or more of the keyframes that are received from the keyframe extraction module 106.

C. Exemplary Embodiments of the Print Layout Generator Module

As explained above, the print layout generator module 14 determines the print layout 32 of the print objects on one or more pages 50 (FIG. 2, block 52) and outputs the print layout (FIG. 2, block 54). In some embodiments, the print layout generator module 110 automatically determines the print layout 32 by assigning respective ones of the print objects to one or more pages and determining a respective layout for each of the pages based on layout rules and layout optimization criteria applied to the print objects assigned to the page.

Figure 6:
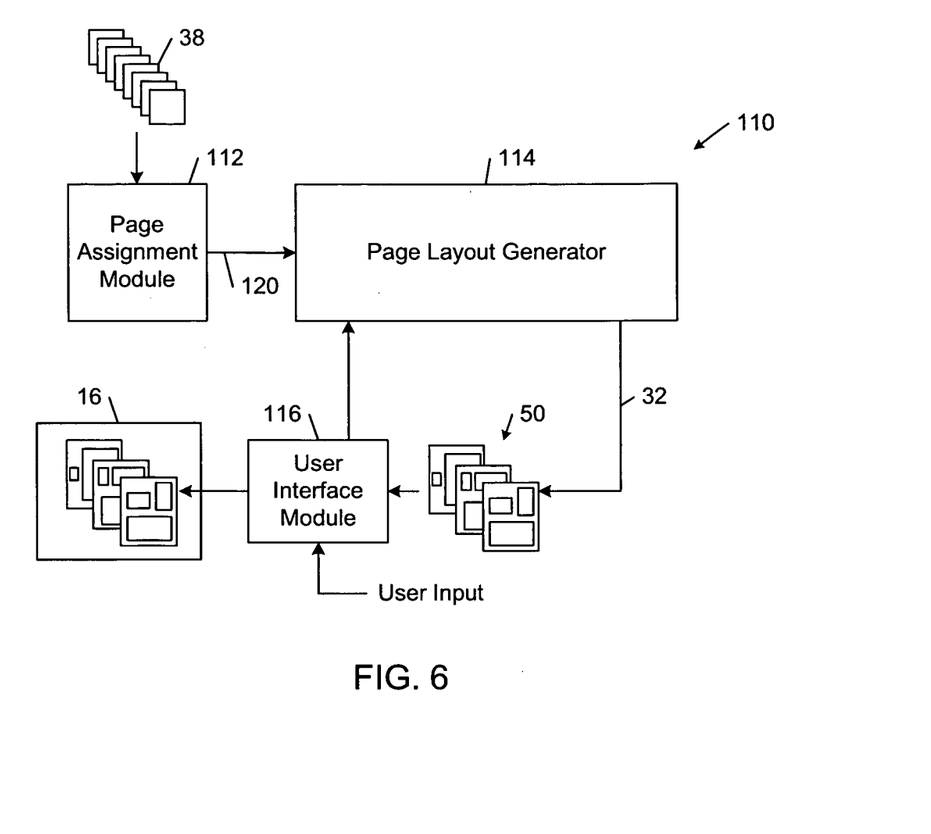
FIG. 6 is a diagrammatic view of an embodiment of a print layout generator module.

FIG. 6 shows an embodiment 110 of the print layout generator module 14 that includes a page assignment module 112, a page layout generator module 114, and a user interface module 116 through which a user interacts with the print layout generator module 110.

Figure 7:
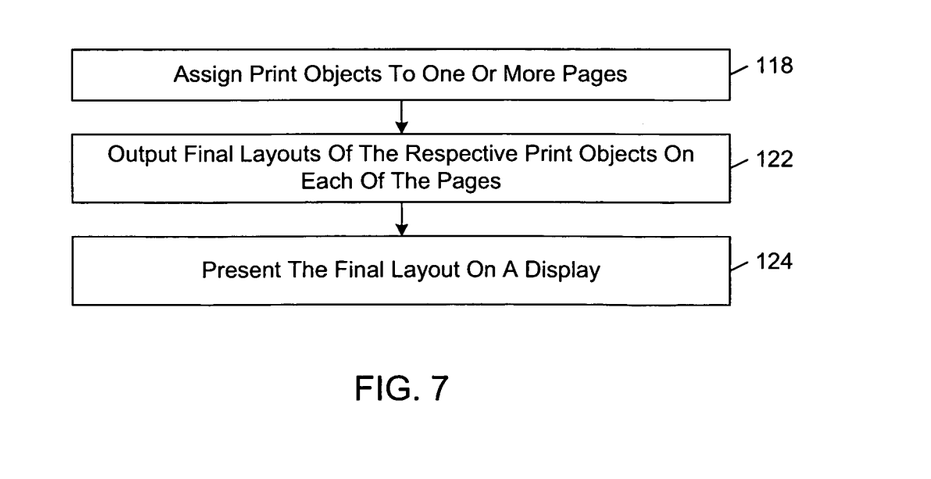
FIG. 7 is a flow diagram of an embodiment of a method of determining and outputting a print layout of print objects.

FIG. 7 shows an embodiment of a method by which the page assignment module 112 and the page layout generator module 114 cooperatively generate a respective layout of graphic objects on each of the one or more pages 50.

The page assignment module 112 assigns graphic objects to one or more pages (FIG. 7, block 68). The page assignment module 112 operates on the collection of print objects 38, which are received from the print object capture module 12. The page assignment module 112 assigns the print objects 38 to the one or more pages 50 using any one of a wide variety of page assignment methods. In some approaches, the page assignment module 112 assigns the print objects 38 to pages based on a page-filling criterion, such as a user-specified or default maximum number of print objects 38 that may be laid out on a page, or a user-specified or default fixed number of pages. In these approaches, the page assignment module 112 may assign the print objects 38 to pages in accordance with one or more arrangement criteria, such as a user-specified arrangement of graphic objects or a default arrangement rule that is specified in terms of metadata that is associated with the print objects 38. The page assignment module 112 typically assigns print objects 38 to pages in the reading order in which the contents of the print objects 38 are arranged in the structured document 18. The page assignment module 112 passes print object page assignment data 120, which specifies the assignments of the print objects 38 to the pages 50, to the page layout generator module 114.

The page layout generator module 114 outputs print layouts 32 of the respective print objects on each of the pages 50 in accordance with the graphic object assignment data 120 (FIG. 7, block 122). In some embodiments, the page layout generator module 114 determines a print layout for a given one of the pages based on a scoring, evaluation, or fitness function. Such a scoring, evaluation, or fitness function may be utilized in a wide variety of different layout generation embodiments, as described in detail below. The page layout generator module 114 outputs the print layouts 32 of the print objects 38 on the one or more pages 50 to the user interface module 66. In some implementations, the page layout generator module 114 outputs the print layouts 32 in the form of a specification that is arranged in a particular file format (e.g., PDF or XML).

The user interface module 116 presents (or renders) the print layouts 32 on the display 16 (FIG. 7, block 124). In some implementations, the user interface module 116 allows a user to interactively browse the pages 50 that are generated automatically by the print layout generator module 14. The user interface module 116 also allows a user to specify edits to the pages. Any specified edits to a given page are interpreted by the user interface module 116. The user interface module 116 transmits the interpreted user command instructions to the page layout generator module 114. The page layout generator module 114 repeats one or more aspects of the method of FIG. 7 to determine revised print layouts 32 of one or more pages in accordance with the edits received from the user interface module 116. The user interface module 116 presents the revised final layouts 32 to the user. The user then may browse the revised pages, specify edits to the one or more revised pages, or command the structured document printing system 10 to render some or all of the pages.

The page layout generator module 114 may determine a print layout of print objects on a given page in a wide variety of different ways.

In some embodiments, the page layout generator module 114 determines a print layout for a given page using a tree structure based partitioning of each page. In this process, the page layout generator module 114 iteratively constructs a series of successive layouts each of which includes an additional one of the graphic objects added to the preceding layout in the series. In each of the iterations, the page layout generator module 114 constructs a current one of the successive layouts from the preceding successive layout based on respective scores. The scores are calculated from comparisons of ones of the actual rendering sizes with respective ones of the target rendering sizes that are computed for candidate current layouts defined by different respective relative positions of the additional graphic object in the preceding successive layout. Additional details regarding the structure and operation of the tree structure based page partitioning embodiments are contained in U.S. application Ser. No. 11/769,671, filed Jun. 27, 2007.

In other embodiments, the page layout generator module 114 determines a print layout for a given page by evolving a respective genetic structure that defines the locations, scales, and rotational orientations of the print objects that are placed on the given page in accordance with a genetic algorithm and selecting a print layout from the resulting layouts based on the above-mentioned scoring, evaluation, or fitness function, along with certain preferences and page requirements. Additional details regarding the structure and operation of the genetic evolution based print object arrangement embodiments are contained in, for example, U.S. Pat. No. 6,636,648 and U.S. Patent Application Publication No. 2002/0122067.

In other embodiments, the page layout generator module 114 determines a print layout for a given page by positioning print objects on a page based on a force model that assumes that each print object imposes a force on other print objects located on the same page. The force is a function of the distance separating the print objects. Each print object is moved in a direction of the net force acting on the print object by a distance that is a function of the net force. Additional details regarding the structure and operation of the force model based print object arrangement embodiments are contained in, for example, U.S. Pat. No. 6,636,650.

V. Exemplary Architectures of the Structured Document Printing System and Associated Application Environments The structured document printing system 10 (see FIG. 1) may be implemented by one or more discrete modules (or data processing components) that may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the methods that are executed by the structured document printing system 10, as well as the data it generates, are stored in one or more machine-readable media.

Figure 8:
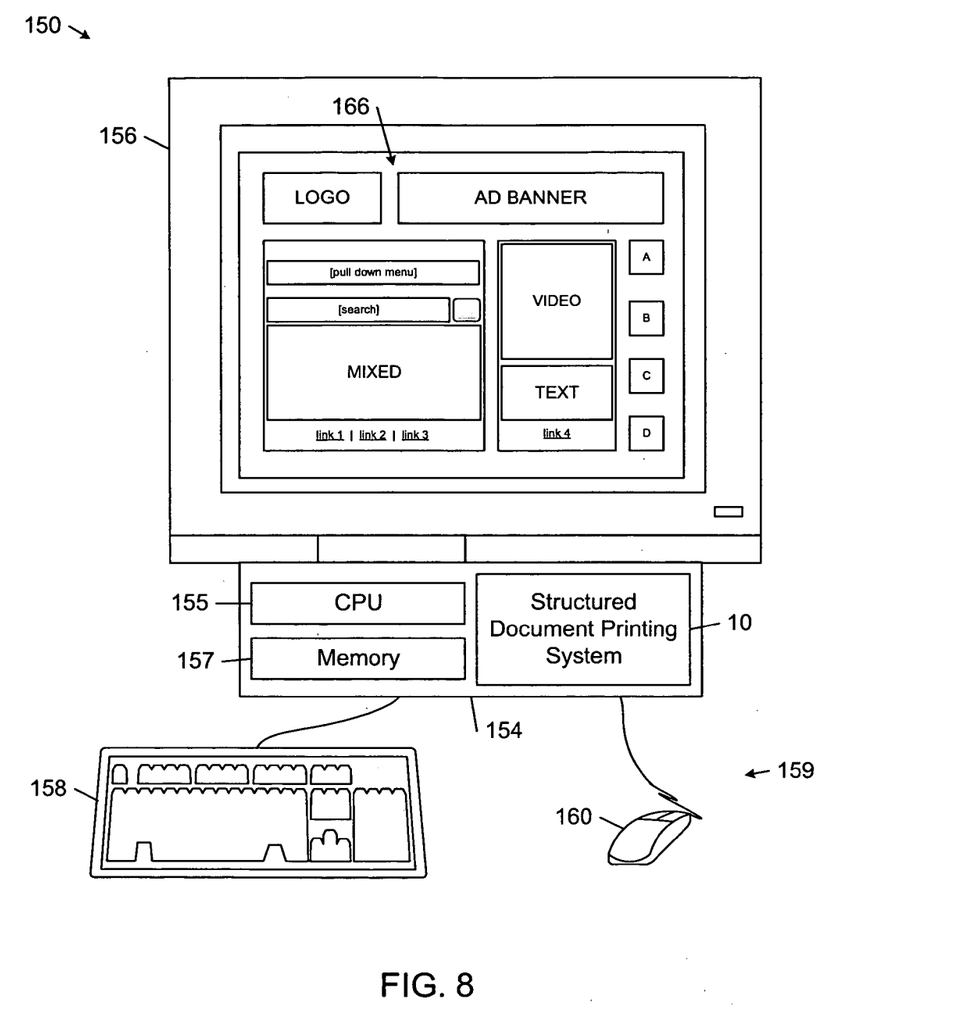
FIG. 8 is a diagrammatic view of an embodiment of the structured document printing system shown in FIG. 1.

FIG. 8 shows an embodiment 150 of the structured document printing system 10 that is incorporated in a computer system 154, and the display 16 is implemented by a computer display monitor 156 that is controlled by a display controller in the computer 154.

The computer system 154 includes a processing unit (CPU) 155, a system memory 157, and a system bus that couples processing unit to the various components of the computer system. The processing unit 155 typically includes one or more processors, each of which may be in the form of any one of various commercially available processors. The system bus may be a memory bus, a peripheral bus or a local bus, and may be compatible with any of a variety of bus protocols, including PCI, VESA, Microchannel, ISA, and EISA. The computer system 154 also includes a persistent storage memory (e.g., a hard drive, a floppy drive, a CD ROM drive, magnetic tape drives, flash memory devices, and digital video disks) that is connected to the system bus and contains one or more computer-readable media disks that provide non-volatile or persistent storage for data, data structures and computer-executable instructions.

The system memory 157 typically includes a read only memory (ROM) that stores a basic input/output system (BIOS) that contains start-up routines for the computer system and a random access memory (RAM). The system memory 157 also stores an instance of the structured document print system 10, a GUI driver, input data, output data, intermediate processing data, and other data. A user may interact (e.g., enter commands or data) with the computer system 154 using one or more input devices 159 (e.g., a keyboard 158, a computer mouse 160, a microphone, joystick, and touch pad). The computer system 154 also typically includes peripheral output devices, such as speakers and a printer. The computer system 154 can connect to remote nodes over a network connection made through a network interface card (NIC). Information may be presented through the graphical user interface (GUI) that is displayed to the user on the computer display monitor 156. The GUI typically is integrated into a web browser application program that is executable by the CPU 155.

VI. Conclusion

The embodiments that are described in detail herein are capable of enabling a user to specify individual elements of structured documents that they would like to print. In this way, these embodiments reduce unnecessary consumption of resources, such as paper and ink. In addition, some of these embodiments are capable of aggregating contents from resources outside of a structured document based on user selection of hyperlink references in structured document. In some implementations, this feature provides users with a convenient mechanism for aggregating content across different web pages and different web sites.

Other embodiments are within the scope of the claims.

What is claimed is:

1. A computer-implemented method, comprising:
  capturing print objects, wherein for each of the print objects the capturing respectively comprises
    receiving a user input gesture over a region of a document being rendered on a display in accordance with a structured object specification of the document,
    identifying an element of the structured object specification being rendered within an active area of the user input gesture on the display, interpreting the user input gesture as a print content designation command,
deriving the print object from the structured object specification in accordance with the identified element of the structured object specification and the print content designation command;
determining a print layout of the print objects on one or more pages; and
outputting the print layout.

2. The method of claim 1, wherein the receiving comprises receiving the user input gesture in the form of a boundary that at least partially surrounds the active area on the display, and the identifying comprises identifying an element of the structured object specification at least a part of which is being rendered within the boundary.

3. The method of claim 1, wherein the receiving comprises receiving the user input gesture in the form of a checkmark having a vertex, the identifying comprises identifying an element of the structured object specification at least a part of which is being rendered near the vertex of the checkmark, and the interpreting comprises interpreting the user input gesture as a print content designation command to include the identified element in the print layout.

4. The method of claim 1, wherein the receiving comprises receiving the user input gesture in the form of a cross mark having two lines crossing at an intersection, the identifying comprises identifying an element of the structured object specification at least a part of which is being rendered near the intersection of the two lines, and the interpreting comprises interpreting the user input gesture as a print content designation command to exclude the identified element from the print layout.

5. The method of claim 1, further comprising modifying one or more display parameters of any region of the document being rendered on the display that corresponds to the identified element of the structured object specification.

6. The method of claim 1, wherein the document is a web page and the structured object specification is represented by a Document Object Model (DOM) in which each element of the structured object specification is represented by a respective DOM object in a hierarchical tree.

7. The method of claim 6, further comprising presenting a representation of the DOM objects in a window on the display and modifying content of the identified element of the structured object specification in response to user input in relation to the presented representation of the DOM objects, and wherein the deriving comprises deriving the print object from the modified element.

8. The method of claim 1, wherein the receiving comprises receiving the input gesture in the form of a selection of a hyperlink reference pointing to a resource outside of the document, and further comprising retrieving the resource based on the hyperlink reference and generating one or more of the print objects from the retrieved resource.

9. The method of claim 8, wherein the hyperlink reference points to a web page, and the generating comprises generating one or more of the print objects by performing the receiving, identifying, interpreting, and deriving with respect to the web page.

10. The method of claim 8, wherein the hyperlink reference points to a video file, and the generating comprises extracting one or more keyframes from the video file and generating one or more of the print objects from the extracted keyframes.

11. The method of claim 1, wherein the determining comprises automatically determining the print layout by assigning respective ones of the print objects to one or more pages and determining a respective layout for each of the pages based on layout rules and layout optimization criteria applied to the print objects assigned to the page.

12. Apparatus, comprising:
a display;
a memory; and
a processing unit coupled to the memory and the display and operable to perform operations comprising
capturing print objects, wherein in the capturing the processing unit respectively performs for each of the print objects operations comprising
receiving a user input gesture over a region of a document being rendered on the display in accordance with a structured object specification of the document,
identifying an element of the structured object specification being rendered within an active area of the user input gesture on the display,
interpreting the user input gesture as a print content designation command,
deriving the print object from the structured object specification in accordance with the identified element of the structured object specification and the print content designation command;
determining a print layout of the print objects on one or more pages; and
outputting the print layout.

13. The apparatus of claim 12, wherein in the receiving the processing unit performs operations comprising receiving the user input gesture in the form of a boundary that at least partially surrounds the active area on the display, and in the identifying the processing unit performs operations comprising identifying an element of the structured object specification at least a part of which is being rendered within the boundary.

14. The apparatus of claim 12, wherein in the receiving the processing unit performs operations comprising receiving the user input gesture in the form of a checkmark having a vertex, in the identifying the processing unit performs operations comprising identifying an element of the structured object specification at least a part of which is being rendered near the vertex of the checkmark, and in the interpreting the processing unit performs operations comprising interpreting the user input gesture as a print content designation command to include the identified element in the print layout.

15. The apparatus of claim 12, wherein in the receiving the processing unit performs operations comprising receiving the user input gesture in the form of a cross mark having two lines crossing at an intersection, in the identifying the processing unit performs operations comprising identifying an element of the structured object specification at least a part of which is being rendered near the intersection of the two lines, and in the interpreting the processing unit performs operations comprising interpreting the user input gesture as a print content designation command to exclude the identified element from the print layout.

16. The apparatus of claim 12, wherein the document (82) is a web page and the structured object specification is represented by a Document Object Model (DOM) in which each element of the structured object specification is represented by a respective DOM object in a hierarchical tree, and the processing unit additionally is operable to perform operations comprising presenting a representation of the DOM objects in a window (88) on the display.

17. The apparatus of claim 16, wherein the processing unit additionally is operable to perform operations comprising modifying content of the identified element of the structured object specification in response to user input in relation to the presented representation of the DOM objects, and wherein the deriving comprises deriving the print object from the modified element.

18. The apparatus of claim 12, wherein in the receiving the processing unit performs operations comprising receiving the input gesture in the form of a selection of a hyperlink reference pointing to a resource outside of the document, and the processing unit additionally is operable to perform operations comprising retrieving the resource based on the hyperlink reference and generating one or more of the print objects from the retrieved resource.

19. The apparatus of claim 12, wherein in the determining the processing unit performs operations comprising automatically determining the print layout by assigning respective ones of the print objects to one or more pages and determining a respective layout for each of the pages based on layout rules and layout optimization criteria applied to the print objects assigned to the page.

20. A non-transitory computer readable medium (157) storing computer-readable instructions causing a computer (154) to perform operations comprising:
  capturing print objects, wherein for each of the print objects the capturing respectively comprises
    receiving a user input gesture over a region of a document being rendered on a display in accordance with a structured object specification of the document,
    identifying an element of the structured object specification being rendered within an active area of the user input gesture on the display,
    interpreting the user input gesture as a print content designation command,
    deriving the print object from the structured object specification in accordance with the identified element of the structured object specification and the print content designation command;
  determining a print layout of the print objects on one or more pages; and
  outputting the print layout.

* * * * *